US009676647B2

United States Patent
Flynn (10) Patent No.: US 9,676,647 B2
(45) Date of Patent: Jun. 13, 2017

(54) NECK RING SYSTEM AND GLASSWARE FORMING PROCESS

(71) Applicant: Owens-Brockway Glass Container Inc., Perrysburg, OH (US)

(72) Inventor: Robin L Flynn, Waterville, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 219 days.

(21) Appl. No.: 14/134,724

(22) Filed: Dec. 19, 2013

(65) Prior Publication Data

US 2015/0175466 A1 Jun. 25, 2015

(51) Int. Cl.
| | |
|---|---|
| *C03B 9/34* | (2006.01) |
| *B65D 1/02* | (2006.01) |
| *C03B 9/193* | (2006.01) |
| *C03B 9/195* | (2006.01) |
| *C03B 9/44* | (2006.01) |

(52) U.S. Cl.
CPC ............ *C03B 9/342* (2013.01); *B65D 1/0207* (2013.01); *C03B 9/195* (2013.01); *C03B 9/1932* (2013.01); *C03B 9/44* (2013.01); *Y10T 428/131* (2015.01)

(58) Field of Classification Search
CPC ......... C03B 9/195; C03B 9/342; C03B 9/353; C03B 9/22; C03B 9/295; C03B 9/2955
See application file for complete search history.

(56) References Cited

U.S. PATENT DOCUMENTS

| | | | |
|---|---|---|---|
| 2,062,522 | A | 6/1933 | Miller |
| 3,198,617 | A | 8/1965 | Denman et al. |
| 3,434,820 | A | 3/1969 | Zappia et al. |
| 3,617,233 | A | 11/1971 | Mumford |

(Continued)

FOREIGN PATENT DOCUMENTS

| | | |
|---|---|---|
| EP | 2647603 | 10/2013 |
| EP | 2657199 | 10/2013 |

(Continued)

OTHER PUBLICATIONS

PCT Int. Search Report and Written Opinion, Int. Serial No. PCT/US2014/070355, Int. Filing Date: Dec. 15, 2014, Applicant: Owens-Brockway Glass Container Inc., Date Mailed: Aug. 5, 2015.

*Primary Examiner* — Cynthia Szewczyk (57) ABSTRACT

A glassware-forming neck ring system includes a neck ring assembly and a carrier assembly carrying the neck ring assembly. The neck ring assembly includes a neck ring guide having a first forming aperture therethrough around a vertical axis, and a neck ring divided along a longitudinal axis into neck ring sections carried by the neck ring guide and movable toward and away from one another along the neck ring guide along a lateral axis. The carrier assembly includes a carrier having a body with a second forming aperture therethrough, longitudinally opposite ends, laterally opposite sides between the ends, and a channel extending between the sides, restricting movement of the neck ring assembly along the vertical and longitudinal axes, and permitting movement of the neck ring assembly along the lateral axis. A process of forming glassware includes carrying the glassware by a neck ring system through an entire glassware forming process from a blank molding station to a ware handler.

8 Claims, 9 Drawing Sheets

(56) References Cited

U.S. PATENT DOCUMENTS

| | | | |
|---|---|---|---|
| 3,622,305 A * | 11/1971 | Becker | C03B 9/28 65/184 |
| 3,644,111 A | 2/1972 | Becker | |
| 3,934,998 A | 1/1976 | Rowe | |
| 4,058,388 A | 11/1977 | Zappia | |
| 4,273,569 A | 6/1981 | Staley | |
| 4,276,075 A * | 6/1981 | Olivotto | C03B 9/1932 65/160 |
| 4,325,725 A | 4/1982 | Fujimoto | |
| 4,339,264 A * | 7/1982 | Dahms | C03B 7/16 65/238 |
| 5,766,292 A | 6/1998 | Schupbach et al. | |
| 6,848,273 B2 | 2/2005 | Leidy et al. | |
| 7,024,887 B2 | 4/2006 | Tijerina-Ramos et al. | |
| 7,073,352 B2 | 7/2006 | Tijerina-Ramos et al. | |
| 7,353,667 B2 | 4/2008 | Flynn | |
| 7,610,776 B2 | 11/2009 | Tijerina-Ramos et al. | |
| 7,721,573 B2 | 5/2010 | Tijerina-Ramos et al. | |
| 7,779,650 B2 | 8/2010 | Tijerina-Ramos et al. | |
| 7,788,950 B2 | 9/2010 | Tijerina-Ramos et al. | |
| 7,793,520 B2 | 9/2010 | Tijerina-Ramos et al. | |
| 7,827,826 B2 | 11/2010 | Tijerina-Ramos et al. | |
| 2008/0209944 A1 | 9/2008 | Tijerina-Ramos et al. | |
| 2008/0223081 A1 | 9/2008 | Tijerina-Ramos et al. | |
| 2008/0229785 A1 | 9/2008 | Tijerina-Ramos et al. | |
| 2008/0264105 A1 | 10/2008 | Tijerina-Ramos et al. | |
| 2008/0271492 A1 | 11/2008 | Tijerina-Ramos et al. | |
| 2014/0090420 A1 * | 4/2014 | Bratton | C03B 9/193 65/64 |

FOREIGN PATENT DOCUMENTS

| | | |
|---|---|---|
| GB | 1349065 | 3/1974 |
| JP | 2006206357 | 8/2006 |
| WO | 2005092804 | 10/2005 |

\* cited by examiner

NECK RING SYSTEM AND GLASSWARE FORMING PROCESS

The present disclosure is directed to glassware manufacturing and, more particularly, to neck rings and methods of transferring neck rings among manufacturing stations.

BACKGROUND AND SUMMARY OF THE DISCLOSURE

Glassware making machines typically employ invert arms for transferring neck ring assemblies between a blank station and a blow station. A neck ring assembly may include opposed neck ring sections and a neck ring guide between the sections to keep the sections aligned during opening and closing of the sections. U.S. Pat. No. 7,353,667 discloses an example of such a neck ring assembly.

A general object of the present disclosure, in accordance with one aspect of the disclosure, is to provide a new neck ring design that may reduce or eliminate the need for swabbing a neck ring with lubricant, and a new method of transferring neck rings among stations of a glass container manufacturing process.

The present disclosure embodies a number of aspects that can be implemented separately from or in combination with each other.

A glassware-forming neck ring system in accordance with one aspect of the disclosure includes a neck ring assembly and a carrier assembly carrying the neck ring assembly. The neck ring assembly includes a neck ring guide having a first forming aperture therethrough around a vertical axis, and a neck ring divided along a longitudinal axis into neck ring sections that are carried by the neck ring guide and that are movable toward and away from one another along the neck ring guide along a lateral axis. The carrier assembly includes a carrier having a body with a second forming aperture therethrough, longitudinally opposite ends, laterally opposite sides between the ends, and a channel extending between the sides, restricting movement of the neck ring assembly along the vertical and longitudinal axes, and permitting movement of the neck ring assembly along the lateral axis.

In accordance with another aspect of the disclosure, there is provided a process of forming glassware that includes the following steps:
(a) acquiring a neck ring system with at least one material handler;
(b) transferring the neck ring system to a blank mold station;
(c) blank molding a glass gob into glassware having a neck finish formed by the neck ring system;
(d) transferring the glassware carried by the neck ring system to a blow mold station;
(e) blow molding the glassware carried by the neck ring system;
(f) transferring the glassware carried by the neck ring system to a ware handler; and
(g) opening the neck ring system to release the glassware from the neck ring system without releasing the at least one material handler from the neck ring system,
wherein the glassware is carried by the neck ring system through the entire glassware forming process from the blank molding station to the ware handler.

BRIEF DESCRIPTION OF THE DRAWINGS

The disclosure, together with additional objects, features, advantages and aspects thereof, will be best understood from the following description, the appended claims and the accompanying drawings, in which:

DETAILED DESCRIPTION

Figure 1A:
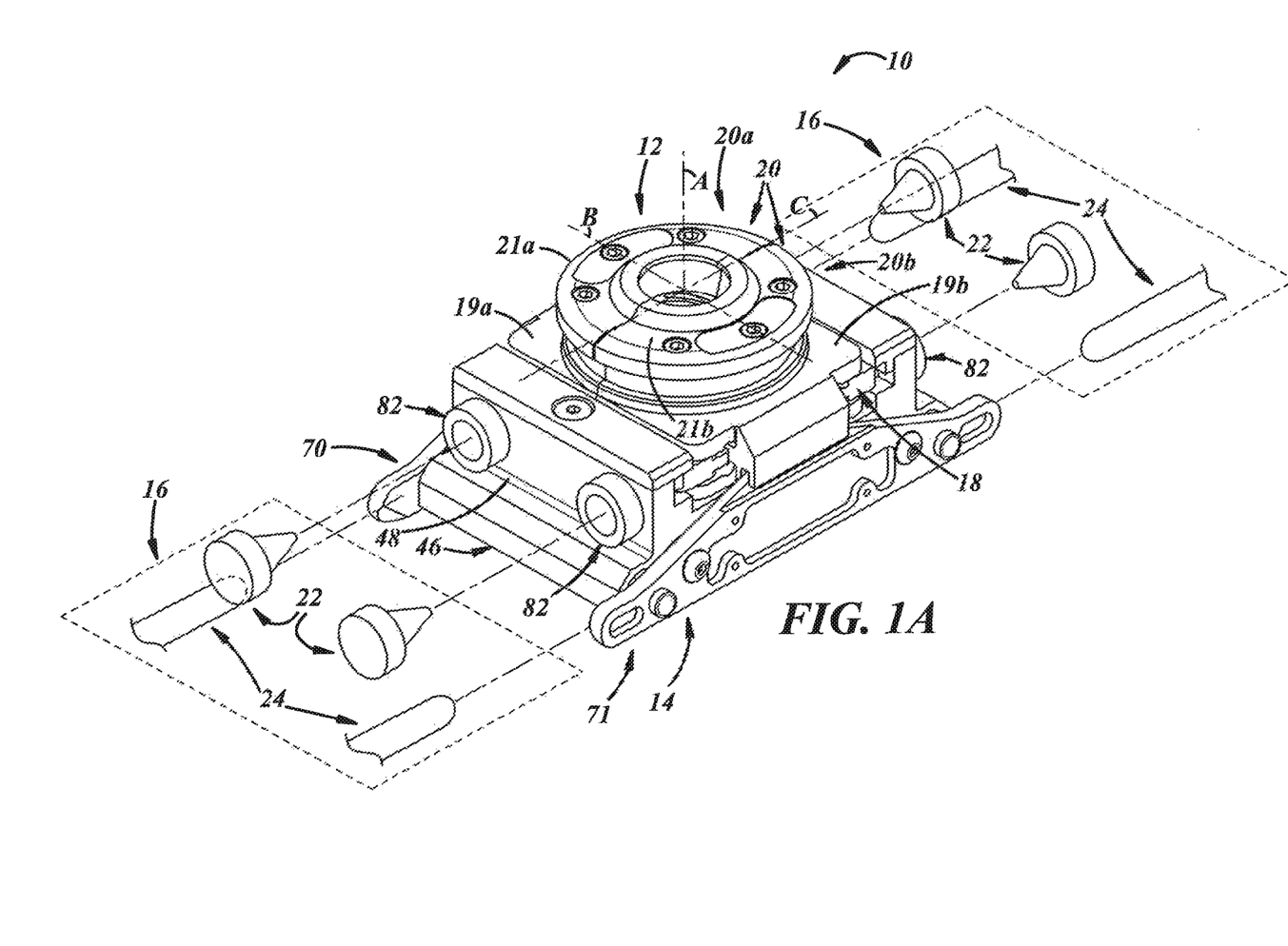
FIG. 1A is a perspective view of a glassware-forming neck ring system in accordance with an illustrative embodiment of the present disclosure, and illustrated in a closed position.
Figure 1B:
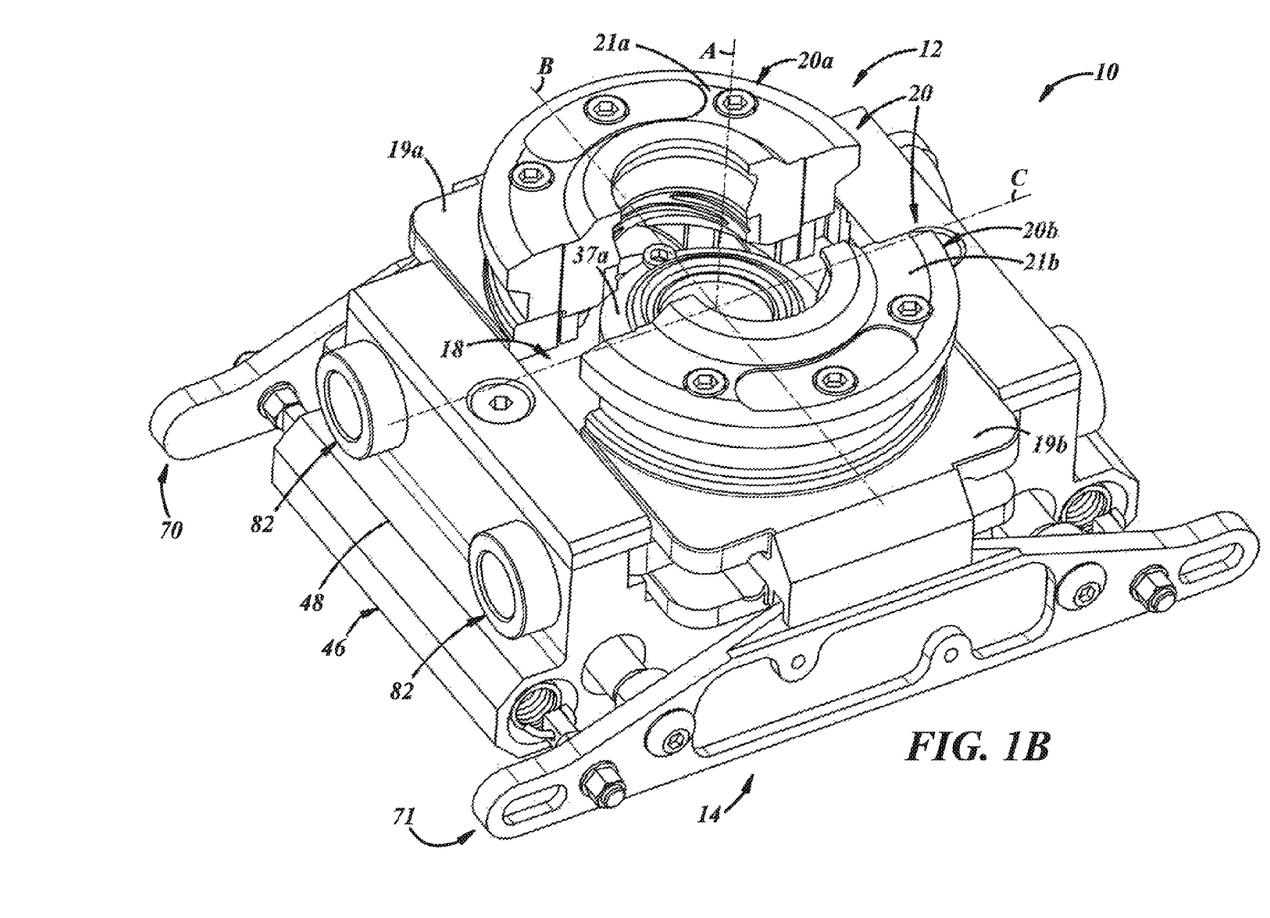
FIG. 1B is a perspective view of the glassware-forming neck ring system of FIG. 1B and illustrated in an open position.

FIGS. 1A-1B illustrate a neck ring system 10 that includes a neck ring assembly 12 carried by a carrier assembly 14. The neck ring system 10 may be used to form glassware in a glassware-forming process. The glassware may include bottles, jars, jugs, growlers, or any other suitable containers. The system 10 may be used to carry an article of glassware through an entire glassware forming process from blank molding of a parison, to releasing a fully formed container on a dead plate or on any other suitable ware handler at a downstream end of the forming process. Accordingly, the system 10 may enable faster machine cycles and facilitate neck ring changes for increased worker safety. Also, as will be described in more detail below, the system 10 may be quickly and accurately acquired and released by a material handler 16 (FIG. 1A), and the neck ring assembly 12 may float along multiple axes with respect to the carrier assembly 14 and the material handler 16. Accordingly, instead of repeated releasing and reacquiring of a glassware neck finish, the system 10 enables continuous carrying of the glassware neck finish and thus, may result in fewer finish defects.

With continuing reference to FIG. 1A, the neck ring assembly 12 includes a neck ring guide 18, and a neck ring 20 that may be divided along a longitudinal axis C into finish inserts or neck ring sections 20a,b carried by the neck ring guide 18 and movable toward and away from one another along the neck ring guide 18 along a lateral axis B. The neck ring sections 20a,b may include base portions 19a,b and semi-circular upper portions 21a,b carried by the base portions 19a,b. The upper portions 21a,b may be coupled to the base portions 19a,b, as illustrated, with cap screws or any other suitable fasteners, or may be coupled thereto in any other suitable manner.

With respect to FIG. 1A, and as will be described in further detail below, the material handler 16 may be used to acquire, release, and reacquire the system 10. The material handler 16 may include a robot with suitable end effectors, a pick and place machine, a continuous powered belt with suitable interface tooling, or any other suitable material handler. For example, the material handler 16 may include locators 22 and actuators 24 for interfacing with the system 10. Such material handlers are well known to those of ordinary skill in the art, and may include any suitable power supplies, controllers, motors, solenoids, sensors, and any other suitable material handler subsystems, components, accessories, and the like.

Figure 2:
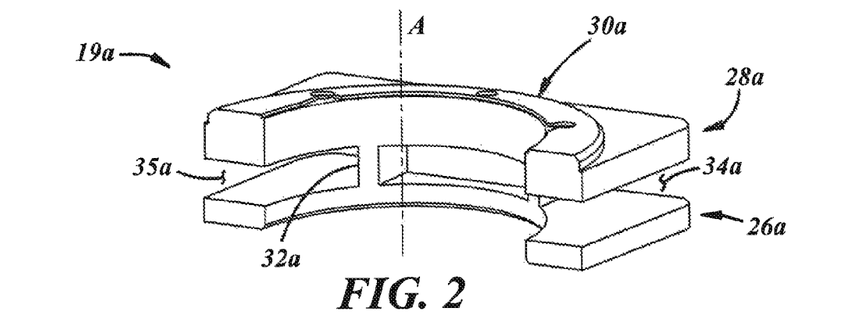
FIG. 2 is an enlarged perspective view of an interior of a portion of a neck ring section of the system of FIG. 1A.
Figure 3:
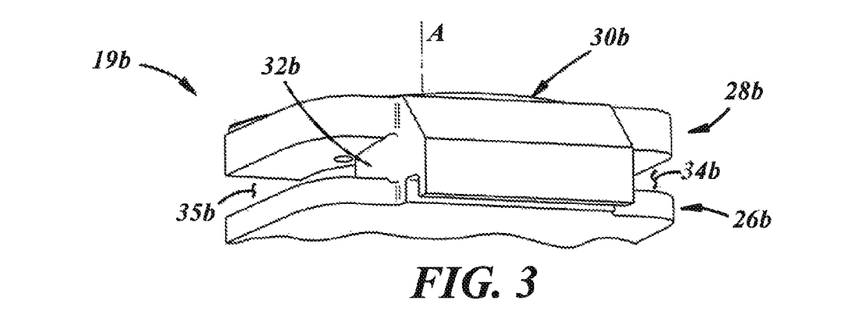
FIG. 3 is an enlarged perspective view of an exterior of the portion of the neck ring section of FIG. 2.

With reference to FIGS. 2 and 3, the neck ring base portions 19a,b may include: lower plate portions 26a,b; upper plate portions 28a,b spaced apart along a vertical axis A from the lower plate portion and carrying bosses 30a,b; extensions 32a,b extending vertically between the plate portions 26a,b and 28a,b; and laterally extending channels 34a,b and 35a,b between the plate portions 26a,b and 28a,b.

Figure 4:
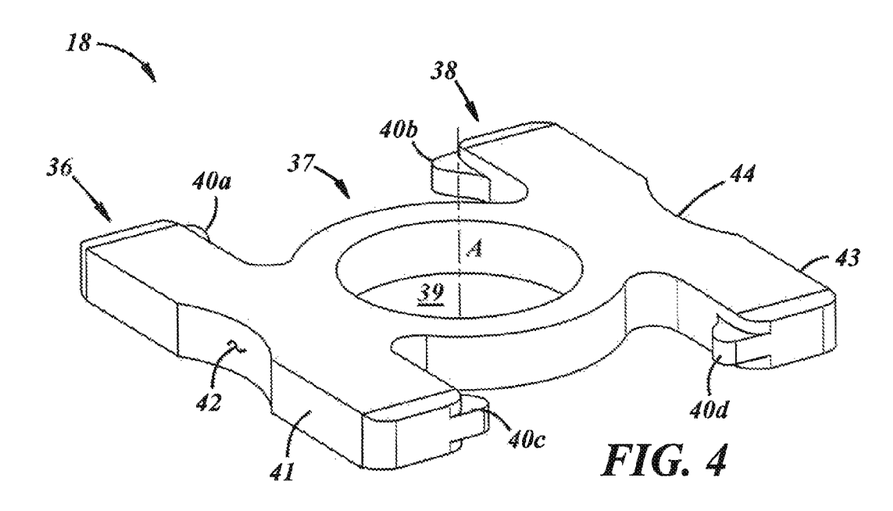
FIG. 4 is an enlarged perspective view of a portion of a neck ring guide of the system of FIG. 1A.

With reference to FIG. 4, the guide 18 may include laterally extending runners 36, 38 longitudinally spaced apart from one another, and a hub 37 extending between the runners 36, 38. The hub 37 may be circular or semi-circular and includes a vertically extending through passage or first forming aperture 39 therethrough around the vertical axis A. Although not shown, the guide 18 also may carry a separate, fully circumferential seal ring 37a (FIG. 1B) coupled to the hub 37. The runners 36, 38 may include axially opposed tangs 40a-d extending longitudinally from free ends or distal portions of the runners 36, 38. The tangs 40a-d may limit movement of the guide plate 18 along the longitudinal axis C when the neck ring opens and closes. In one example, in assembly, the tangs 40a-d may protrude about 5/32" from the runners 36, 38, with about 1/32" spacing between the tangs 40a-d and the base portions 19a,b, or according to any other suitable spacing. The tangs 40a-d also may guide corresponding surfaces 32a, 32b of the neck ring base portions 19a, 19b when the neck ring opens and closes. Also, the guide 18 may include indentations 42, 44 in longitudinal ends 41, 43 of the runners 36, 38, as will be described in greater detail below.

Figure 5:
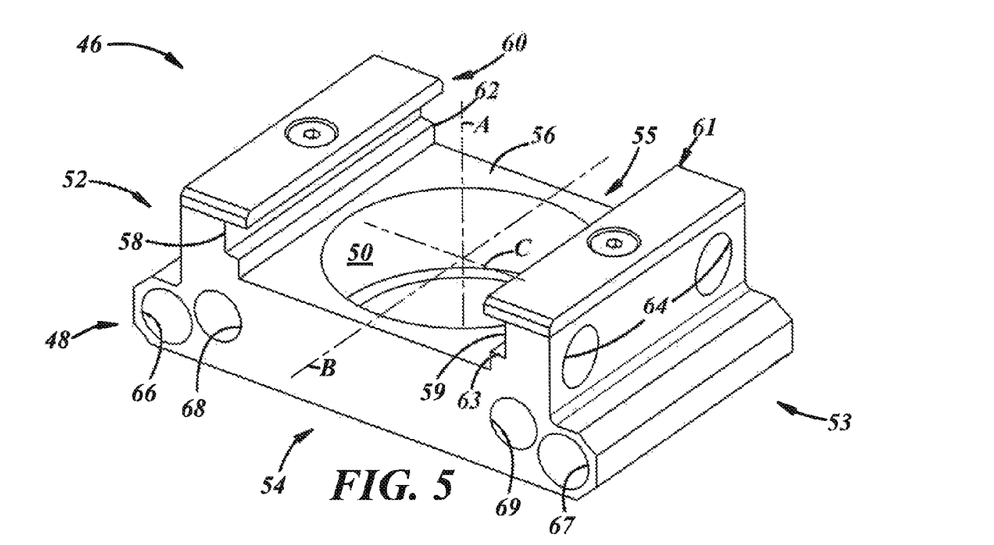
FIG. 5 is an enlarged perspective view of a carrier body of the system of FIG. 1A.

With reference to FIG. 5, the carrier assembly 14 of FIG. 1A includes a carrier 46 having a body 48 with a second forming aperture 50 therethrough, longitudinally opposite ends 52, 53, and laterally opposite sides 54, 55 between the ends 52, 53. The body 48 also may have a channel open to and extending between the sides 54, 55, for restricting movement of the neck ring assembly 12 along the vertical and longitudinal axes A, C and permitting movement of the neck ring assembly 12 (FIG. 1A) along the lateral axis B. The body 48 further may include a base surface 56 spaced below the neck ring assembly 12 (FIG. 1A) thereon, and longitudinal restraints 58, 59 which may include walls extending along the vertical axis A away from the base surface 56 and along the lateral axis B between the sides 54, 55. The channel may be bounded along the longitudinal axis C by the longitudinal restraints 58, 59, and along the vertical axis A by vertical restraints 60, 61. The restraints 60, 61 may be separate components, for instance, plates, brackets, rods, bars, or the like, that may be fastened or otherwise coupled to the longitudinal restraints 58, 59 of the body 48, as illustrated, or that may be integral portions of the body 48. Shoulders 62, 63 may extend between the base surface 56 and the longitudinal restraints 58, 59 to trap portions of the neck ring guide 18 (FIG. 4) between the shoulders 62, 63 and the vertical restraints 60, 61 of the carrier 46. The ends 52, 53 may include material handling locator pockets 64, and the sides 54, 55 may include through bores 66, 67, 68, 69.

Figure 6:
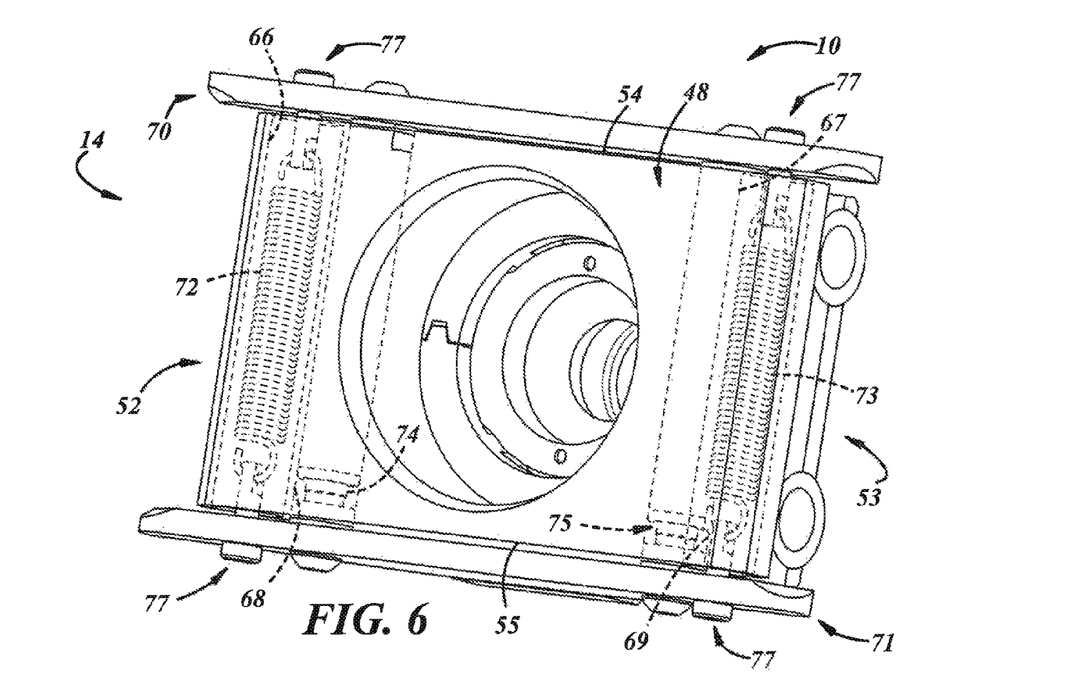
FIG. 6 is an enlarged bottom perspective view of the system of FIG. 1A.
Figure 7:
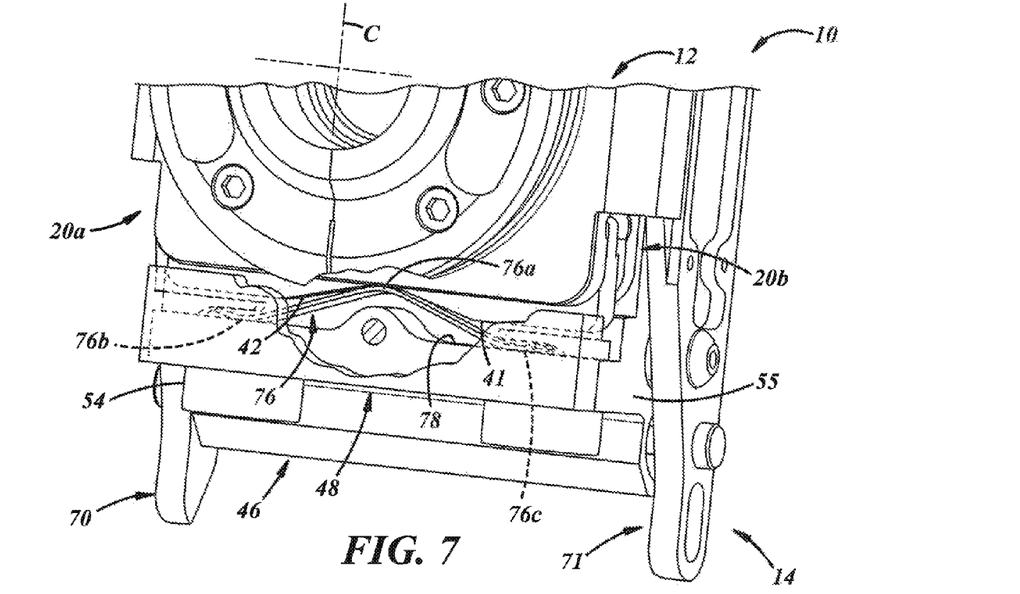
FIG. 7 is an enlarged, fragmentary, top perspective view of the system of FIG. 1A.

With reference to FIGS. 6 and 7, the carrier assembly 14 also includes transmissions 70, 71 movably carried at the sides 54, 55 of the carrier body 48 to transmit actuation, for example, from actuators of a material handler (not shown), to the neck ring sections 20a,b. The transmissions 70, 71 may be carried at or along the sides 54, 55 of the movable neck ring sections 20a,b, and may be biased toward one another.

For example, and with reference to FIG. 6, the transmissions 70, 71 may be biased via tension springs 72, 73 carried by the body, so as to bias the neck ring sections 20a,b to a closed position. The springs 72, 73 may be carried in the through bores 66, 67 (FIG. 5) of the carrier body 48, and may be coupled to the transmissions 70, 71 by pins 77, for example, extension spring anchor pins as illustrated, or in any other suitable manner by any other suitable elements. The transmissions 70, 71 may be plate-like members as illustrated in FIGS. 1, 6, and 7, or may be bars, brackets, rods, plates, or of any other suitable configuration. With respect to FIG. 6, the transmissions 70, 71 may extend past the ends 52, 53 of the carrier 46 to facilitate engagement by the material handler actuators 24 (FIG. 1A). Also, the carrier assembly 14 may include guides 74, 75 carried by the carrier body 48 between the sides 54, 55, for example, through the through bores 68, 69 (FIG. 5) of the carrier body 48. The guides 74, 75 may be fastened, or otherwise coupled, to the transmissions 70, 71 to guide movement thereof with respect to one another. Also, the guides 74, 75 may be solid guide shafts, sets of nested guide shafts, guide rails, or any other suitable guide configuration. In another embodiment, the guides 74, 75 may be portions of actuators built into the assembly 14 to replace or supplement the actuators 24 for opening and closing the assembly 14. Such actuators may be electromechanical, hydraulic, or pneumatic actuators, and may be powered and controlled in any suitable manner via any suitable power and control sources via any suitable connections thereto.

With reference to FIG. 7, the carrier assembly 14 may include springs 76 positioned between the carrier 46 and the neck ring assembly 12 to center the neck ring assembly 12 with respect to the carrier assembly 14 along the lateral and longitudinal axes B and C. More specifically, the springs 76 may be positioned between internal sides 78 of the carrier body 48 and the ends 41 of the neck ring guide 18 to center the neck ring assembly 12 with respect to the carrier assembly 14 along the longitudinal axis C. The sides 78 may be longitudinally inboard surfaces of the restraints 58, 59. Even more particularly, the indentations 42, 44 in the neck ring guide 18 may correspond to portions of the springs 76 to facilitate centering of the neck ring guide 18 as the neck ring sections 20a,b open and close. For example, the springs 76 may include bent sections 76a in contact with the corresponding indentations 42, and base portions 76b,c in contact with corresponding portions of the carrier body internal sides 78.

The springs 76 may facilitate use of desirable no-swab molding operations and may prevent or reduce damage to sealing surfaces. The springs 76 may tend to center the guide 18, i.e., prevent the guide 18 from being pulled in one direction or the other by the neck ring sections 20*a,b* when they are opened to release a container being molded. Accordingly, such centering can help prevent a guide plate insert from pulling on or hitting a finish of the container as the container is being released. Also, such centering of the guide 18 can make it easier to close the neck ring sections 20*a,b*.

Figure 8:
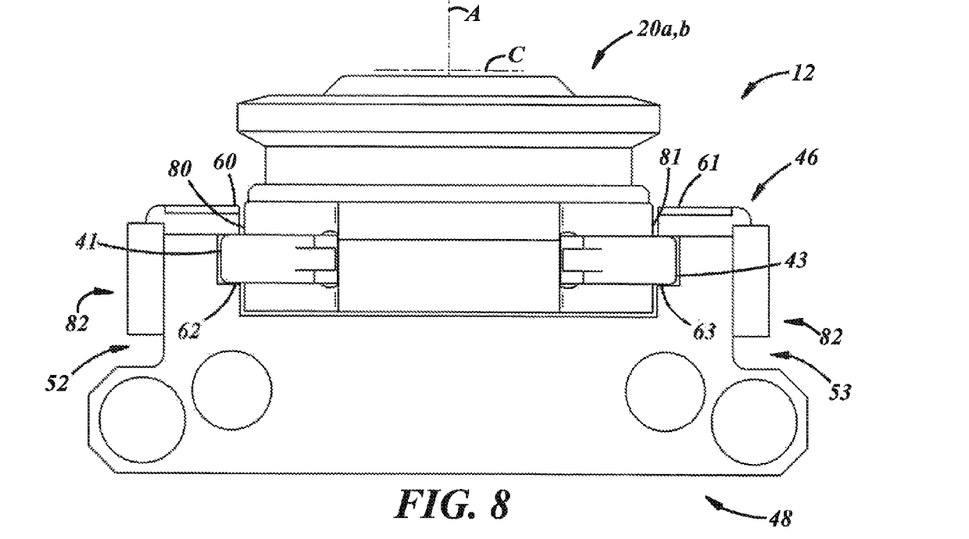
FIG. 8 is an enlarged end view of the system of FIG. 1A, with several components omitted for clarity.

With reference to FIG. 8, the neck ring sections 20*a,b* have axially opposite section ends 80, 81, and the neck ring guide 18 has the axially opposite ends 41, 43 that project beyond the section ends 80, 81 along the longitudinal axis C. The guide ends 41, 43 may be trapped between corresponding portions of the carrier 46 with spaces therebetween to allow the neck ring assembly 12 to float with respect to the carrier assembly 14 along the vertical axis A. For example, the neck ring assembly 12 may float on the order of ⅟₃₂ to ⅟₁₆ of an inch to allow for cavity-to-cavity alignment differences between molds in multi-gob forming operations. More specifically, the guide ends 41, 43 may be trapped between the vertical restraints 60, 61 of the carrier 46 and the base surface 56 of the carrier 46. Even more particularly, the guide ends 41, 43 may be trapped between the vertical restraints 60, 61 of the carrier 46 and the shoulders 62, 63 of the carrier 46. Likewise, the guide ends 41, 43 are spaced apart from corresponding portions of the carrier 46, to allow the neck ring assembly 12 to float with respect to the carrier assembly 14 along the longitudinal axis C. More specifically, the guide ends 41, 43 may be trapped between the longitudinal restraints 58, 59 of the carrier body 48. Finally, the carrier ends 52, 53 may carry system locators 82 for interfacing with the material handler locators 22. For example, in one embodiment, the system locators 82 may be carried in the locator pockets 64 (FIG. 5) of the carrier body 48 or in any other suitable manner, and may be fastened, press fit, adhered, welded, or otherwise coupled thereto in any other suitable manner. In other embodiments, the locators 82 may be integral portions of the pockets 64.

With reference again to FIG. 1A, the system locators 82 may be conical to allow float between the system 10 and the locators 22 of the material handler 16. For example, the system locators 82 may include conical bushings or internal cones and the material handler locators 22 may include corresponding conical pins or external cones for insertion into the internal cones, or vice versa. In one example, the material handler locators 22 may fully couple to the system locators 82 for rigid coupling, for example, during transfer from station to station. More specifically, the material handler locators 22 may be engaged to the system locators 82 to a full engagement depth. In another example, the material handler locators 22 may partially couple to the system locators 82 for floatable coupling, for example, during blank molding and/or blow molding. More specifically, the locators 22 may engage to the locators 82, or may be retracted from the full engagement depth, to a partial engagement depth. In any case, the system locators 82 may serve as common handling locations that allow for various material handler 16 and/or station misalignments. Such common handling locations and/or the multiaxial float of the system 10 and/or of the interface between the system 10 and the material handler 16 allow the material handler 16 to maintain its coupling to the system 10, or to reacquire the system 10, during blank molding, blow molding, or the like. Accordingly, once a station cycle is complete, the material handler 16 can begin moving the system 10 to a downstream station without having to wait for a station to fully complete its cycle, for instance, a complete withdrawal of a plunger or blowhead assembly.

Figure 9:
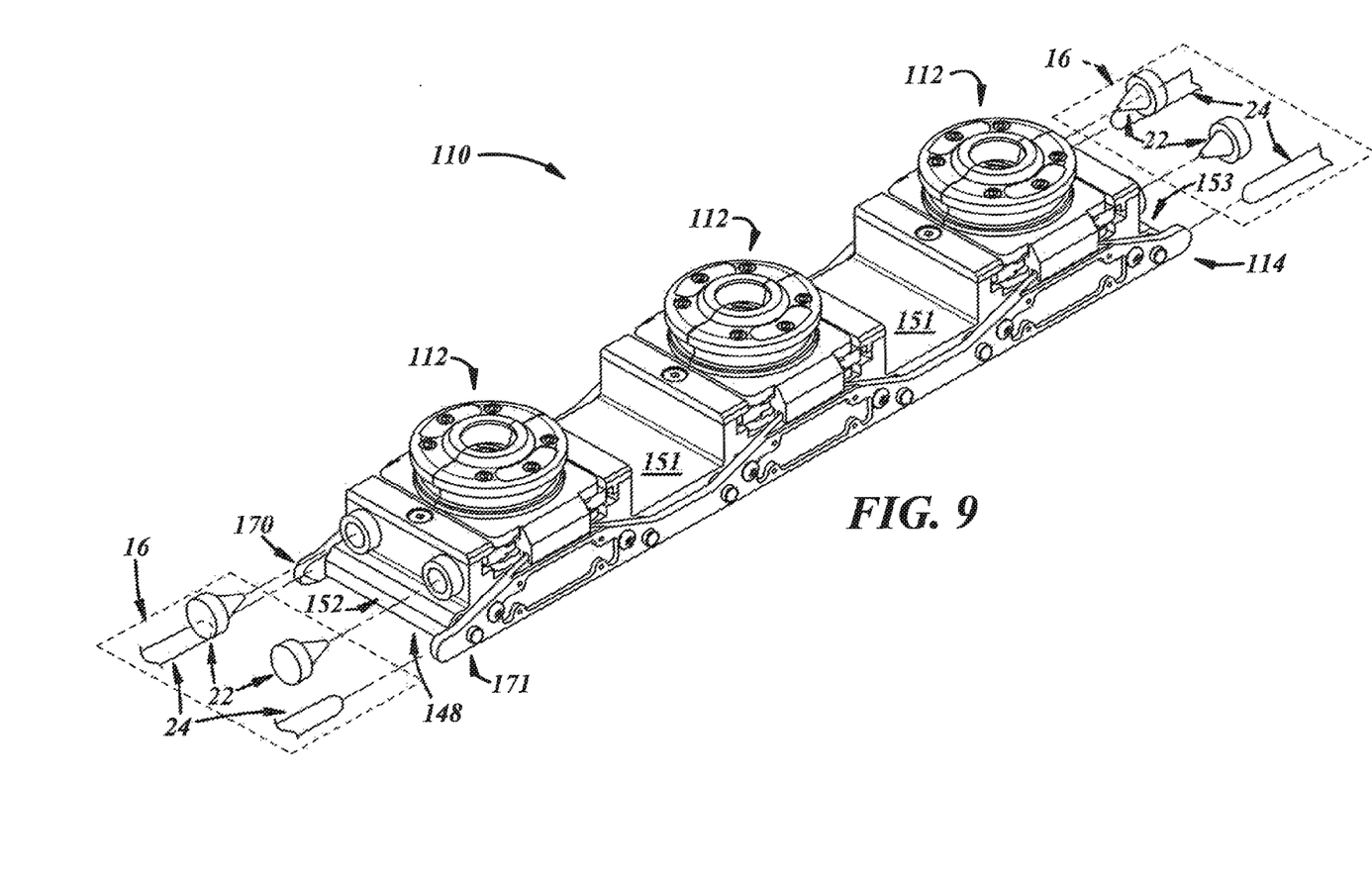
FIG. 9 is a perspective view of a glassware-forming neck ring system in accordance with another illustrative embodiment of the present disclosure.
Figure 10:
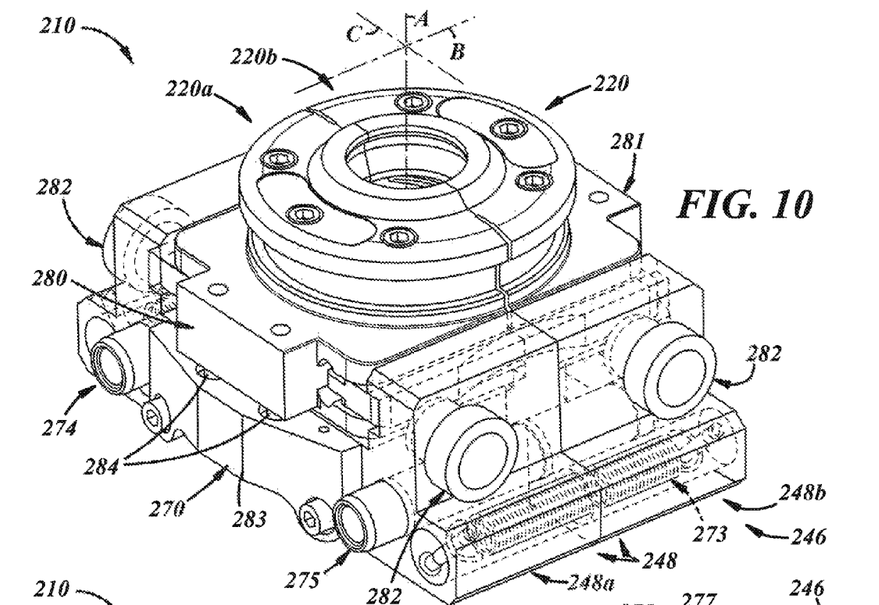
FIG. 10 is a top perspective view of a glassware-forming neck ring system in accordance with a further illustrative embodiment of the present disclosure, illustrated in a closed position.
Figure 11:
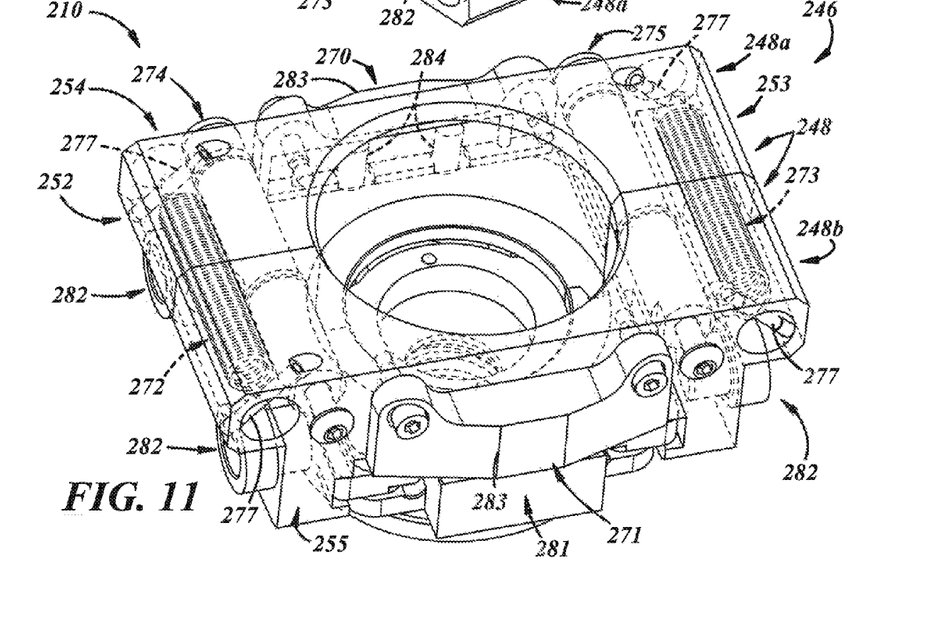
FIG. 11 is a bottom perspective view of the system of FIG. 10.

FIG. 9 shows another illustrative embodiment of a neck ring system 110. This embodiment is similar in many respects to the embodiments of FIGS. 1A-8 and like numerals among the embodiments generally designate like or corresponding elements throughout the several views of the drawing figures. Accordingly, the descriptions of the embodiments are incorporated into one another, and description of subject matter common to the embodiments generally may not be repeated here.

The system 110 includes a common carrier assembly 114 carrying multiple, or a plurality of, neck ring assemblies 112 between ends 152, 153. Although the illustrated embodiment shows three neck ring assemblies 112, the common carrier assembly 114 may carry two, four, or any other suitable quantity of the neck ring assemblies 112. The neck ring assemblies 112 may be substantially similar if not the same as the neck ring assembly 12 of FIG. 1A. Likewise, the assembly 114 may include a carrier body 148 that may be substantially similar to the carrier body 48 of FIG. 1A, except for the length of the body 148. Here, the body 148 includes intermediate or connecting portions 151 and the fact that multiple neck ring assemblies 112 are accommodated. The carrier assembly 114 also includes transmissions 170, 171 movably carried at the sides of the carrier body 148 to transmit actuation, for example, from actuators of a material handler (not shown), to the neck ring assemblies 112.

FIGS. 10-14 show another illustrative embodiment of a neck ring system 210. This embodiment is similar in many respects to the embodiments of FIGS. 1A-9 and like numerals among the embodiments generally designate like or corresponding elements throughout the several views of the drawing figures. Accordingly, the descriptions of the embodiments are incorporated into one another, and description of subject matter common to the embodiments generally may not be repeated here.

In this embodiment, a carrier 246 with a carrier body 248 divided along the longitudinal axis C to include carrier body sections 248*a,b* that correspond to neck ring sections 220*a,b* of a neck ring 220 and that are movable toward and away from one another along the lateral axis B. Movement of the sections 248*a,b* may be guided by guides 274, 275 that may extend through corresponding bores of the sections 248*a,b*. The guides 274, 275 may have ends fastened to one side 255 of one of the sections 248*b*, as illustrated, or may be otherwise coupled to one or both of the sections 248*a,b* in any other suitable manner. Closing motion of the sections 248*a,b* may be provided by tension springs 272, 273 that may extend through corresponding bores of the sections 248*a,b*. The tension springs 272, 273 may be coupled to the sections 248*a,b* via pins 277 (e.g., roll pins) extending transversely through the corresponding spring bores, as illustrated, or may be coupled to the sections 248*a,b* in any other suitable manner. The carrier body sections 248*a,b* also may include spaced apart material handling locators 282 to facilitate location and opening actuation by a material handler (not shown) that includes locators that both locate the system 210 and actuate the system 210 to its open position.

Figure 12:
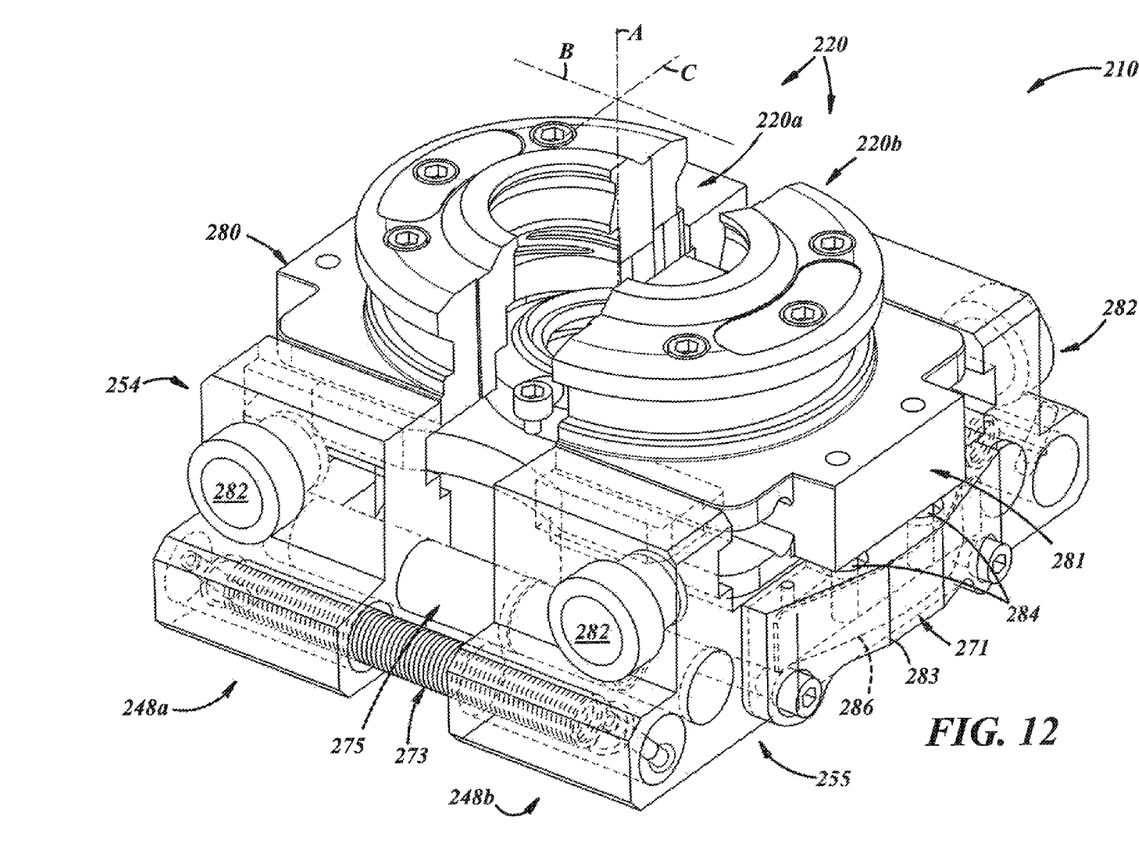
FIG. 12 is an enlarged top perspective view of the system of FIG. 10, but illustrated in an open position.

Accordingly, with reference to FIG. 12, the locators 282 may be displaced in a direction away from one another along the lateral axis B by a corresponding material handler (not shown). In turn, transmissions (270, FIG. 11), 271 pull the corresponding sides 280, 281 of the neck ring sections 220*a*, 220*b* so as to open the neck ring 220. Of course, the springs 272, 273 pull closed the body sections 248a,b, which, in turn, pull closed the neck ring 220. In this embodiment, the transmissions 270, 271 need not extend past the ends 252, 253 of the carrier assembly 214.

With respect to FIGS. 10-14, in the illustrated example, the transmissions 270, 271 may be lost motion transmissions to provide float between the neck ring sections 22a,b and the carrier 246, and may include brackets 283 coupled to the sides 254, 255 of the sections 248a,b, pins 284 coupled between the brackets 283 and sides 280, 281 of the neck ring sections 220a,b, and springs 286 (FIG. 12) disposed between interior surfaces of the brackets 283 and the pins 284. The brackets 283 may be bars, plates, rods, or any other suitable brackets. The pins 284 may be pressed, threaded, or the like, into corresponding holes in the neck ring section sides 280, 281. The springs 286 may be leaf springs and may be generally rectangular, as illustrated, or of any other suitable shape.

Figure 13:
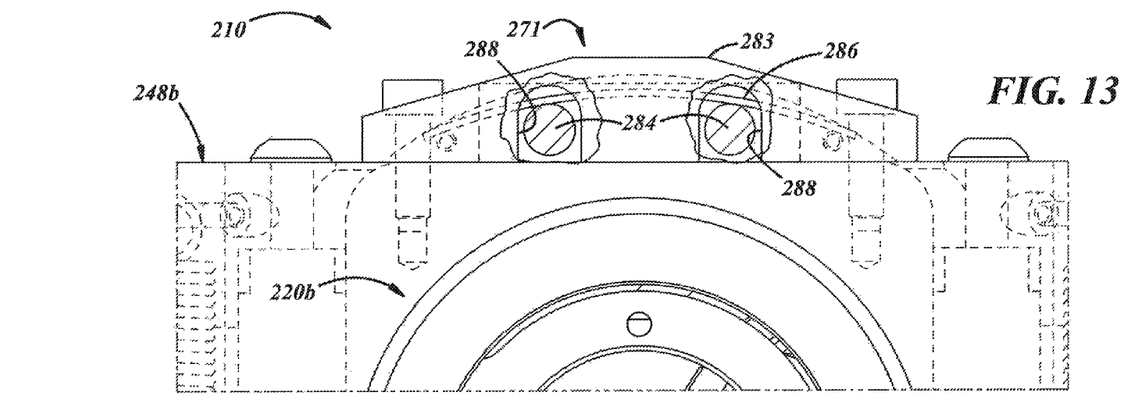
FIG. 13 is an enlarged, fragmentary, bottom view of the system of FIG. 10, illustrated in a closed position.
Figure 14:
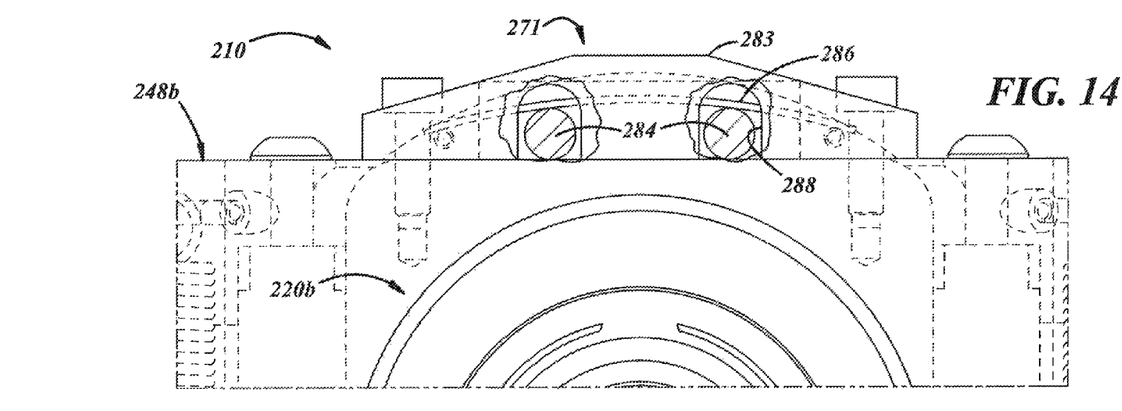
FIG. 14 is an enlarged, fragmentary, bottom view of the system of FIG. 10, illustrated in an open position.

With respect to FIGS. 13 and 14, the brackets 283 may include curved interior surfaces corresponding to the leaf springs 286, and reliefs 288 extending axially through the brackets 283 to provide clearance for the pins 284 and allow limited movement of the neck ring sections 220b (220a, FIG. 12) with respect to the body sections 248b (248a, FIG. 12). For example, in the closed position of the system 210, there are clearances between the pins 284 and closed ends of the reliefs 288 to allow the neck ring sections 220b (220a, FIG. 12) to float. The reliefs 288 may be open ended slots, as illustrated, or any other suitable reliefs. As shown in FIG. 14, during system 210 opening, the leaf springs 286 urge the pins 284 against the carrier body sections 248b (248a, FIG. 12), and the opening of the carrier body sections 248b (248a, FIG. 12) pulls open the neck ring sections 220b (220a, FIG. 12).

A process of forming glassware may use one or more of the previously disclosed systems 10, 110, 210, or any other suitable neck ring system. The process includes acquiring a neck ring system with at least one material handler, transferring the neck ring system to a blank mold station, and blank molding a glass gob into glassware having a neck finish formed by the neck ring system. Between the transferring and blank molding steps, the process also may include partially retracting locators of the material handler along a longitudinal axis to allow the entire system to float relative to the material handler during blank molding. The process also may include transferring the glassware carried by the neck ring system to a blow mold station, and blow molding the glassware carried by the neck ring system. Between the transferring and blow molding steps, the process again may include partially retracting locators of the material handler along the longitudinal axis to allow the entire system to float relative to the material handler during blow molding. The process further may include transferring the glassware carried by the neck ring system to a ware handler, and opening the neck ring system to release the glassware from the neck ring system without releasing the at least one material handler from the neck ring system. The glassware is carried by the neck ring system through the entire glassware forming process from initial engagement of a glass gob with the system at a blank molding station to disengagement with glassware at a ware handler.

In other embodiments, the process also may include releasing the neck ring system from the at least one material handler to a return conveyor after the system opening step. Subsequently, the process may include conveying the neck ring system to a location proximate the blank mold station. For example, the conveying step may include allowing the system to flow passively by gravity down a chute or other conveyor, or to actively flow via a powered conveyor, or to be conveyed by a robot, pick and place apparatus, or any other suitable conveyor or material handling apparatus. In one embodiment, the process begins at a blank mold station, ends at a ware handler, and simply may be repeated. In another embodiment, the process instead may include inspecting the system, releasing the system to a maintenance station or other offline location if the system needs maintenance, and replacing the system with a replacement system, which may be sent toward or to the blank mold station. Accordingly, the process may facilitate swapping out neck rings on the fly, while a production line is running, instead of having to shut down the production line to swap out neck rings. Likewise, the process may facilitate rapid and safe changeover from one type of neck ring to another.

In yet other embodiments of the process, one more of the aforementioned steps may be carried out with the at least one material handler coupled to the neck ring system. Also, the glassware may be carried by the neck ring system through one or more intermediate stations between the blank and blow molding steps and/or between the blow molding and system opening steps. Such intermediate stations may include cooling stations, heating stations, inspection stations, or any other suitable stations. Furthermore, multiple articles of the glassware are carried by the neck ring system, which may be the system 110 of FIG. 9, or any other suitable neck ring system.

There thus has been disclosed a neck ring system and a related manufacturing process that fully satisfy one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process of forming glassware that includes the steps of:
    (a) acquiring a neck ring system with at least one material handler;
    (b) transferring the neck ring system to a blank mold station;
    (c) blank molding a glass gob into glassware having a neck finish formed by the neck ring system;
    (d) transferring the glassware carried by the neck ring system to a blow mold station;
    (e) blow molding the glassware carried by the neck ring system;
    (f) transferring the glassware carried by the neck ring system to a ware handler; and
    (g) opening the neck ring system to release the glassware from the neck ring system without releasing the at least one material handler from the neck ring system,
    wherein the glassware is carried by the neck ring system through the entire glassware forming process from the blank molding station to the ware handler,
    (h) releasing the neck ring system from the at least one material handler to a return conveyor;
    (i) conveying the neck ring system to a location proximate the blank mold station, and
    (j) repeating steps (a) through (j).

2. The process set forth in claim 1, wherein steps (c) through (f) are carried out with the at least one material handler coupled to the neck ring system.

3. The process set forth in claim 1, wherein the glassware is carried by the neck ring system to one or more intermediate stations between steps (c) and (e) and/or between steps (e) and (g).

4. The process set forth in claim 1, wherein multiple articles of the glassware are carried by the neck ring system.

5. A process of forming glassware that includes the steps of:
   (a) acquiring a neck ring system with at least one material handler;
   (b) transferring the neck ring system to a blank mold station;
   (c) blank molding a glass gob into glassware having a neck finish formed by the neck ring system;
   (d) transferring the glassware carried by the neck ring system to a blow mold station;
   (e) blow molding the glassware carried by the neck ring system;
   (f) transferring the glassware carried by the neck ring system to a ware handler; and
   (g) opening the neck ring system to release the glassware from the neck ring system without releasing the at least one material handler from the neck ring system,
   wherein the glassware is carried by the neck ring system through the entire glassware forming process from the blank molding station to the ware handler, and
   partially retracting locators of the material handler to allow the entire system to float relative to the material handler during at least one of the blank molding step or the blow molding step.

6. The process set forth in claim 5, wherein steps (c) through (f) are carried out with the at least one material handler coupled to the neck ring system.

7. The process set forth in claim 5, wherein the glassware is carried by the neck ring system to one or more intermediate stations between steps (c) and (e) and/or between steps (e) and (g).

8. The process set forth in claim 5, wherein multiple articles of the glassware are carried by the neck ring system.

\* \* \* \* \*